US006678930B1

(12) United States Patent
Owoc

(10) Patent No.: US 6,678,930 B1
(45) Date of Patent: Jan. 20, 2004

(54) UNIVERSAL SNAP-RING TOOL

(76) Inventor: Greg J. Owoc, 106 Galphin Dr., Greenville, SC (US) 29609

( * ) Notice: Subject to any disclaimer, the term of this patent is extended or adjusted under 35 U.S.C. 154(b) by 0 days.

(21) Appl. No.: 10/285,276

(22) Filed: Oct. 31, 2002

(51) Int. Cl.[7] ................................................ B23P 19/04
(52) U.S. Cl. ........................................... 29/229; 81/302
(58) Field of Search ..................... 29/229, 225; 81/302, 81/421, 423; 30/234, 235, 236, 252, 261, 262

(56) References Cited

U.S. PATENT DOCUMENTS 2,741,829 A * 4/1956 Krodel ........................ 29/229
3,365,782 A * 1/1968 Madeira ...................... 29/229
3,813,750 A * 6/1974 Kerr ............................ 29/229
3,990,137 A * 11/1976 Kulba et al. .................. 29/229
4,351,097 A * 9/1982 Hashimoto et al. ........... 29/229
5,826,467 A * 10/1998 Huang ......................... 81/302

* cited by examiner

*Primary Examiner*—George Nguyen
*Assistant Examiner*—Daniel Shanley
(74) *Attorney, Agent, or Firm*—Robert R. Reed

(57) ABSTRACT

The retainer or snap-ring tool of this invention includes a pair of jaws with only one of the jaws attached to a single handle. The jaws are disposed to be spread apart one from the other by a jaw positioning device. The lower end of each jaw is equipped with a tip to interface with the free ends of various types of snap-rings. The tips force the ring to extend or contract when placing the ring on a shaft or within a cylindrical bore of a body. The jaw positioning device comprises a threaded shaft having a positioning wheel formed integral with the shaft to rotate the shaft and move the pair of tips at the ends of the jaws with respect to one another. The tips remain a fixed distance from one another without gripping the handle. The universal tool of this invention works equally well for internally and externally applied snap-rings without any changing or modification of the tool.

15 Claims, 9 Drawing Sheets

UNIVERSAL SNAP-RING TOOL

BACKGROUND OF THE INVENTION

This invention is directed to tools to facilitate assembly and disassembly of various mechanical devices in which components are held together by retainer or snap-rings, and, more particularly, to a single tool with jaw members specifically configured and operated to easily access the free ends of both interior and exterior snap-rings for installation and removal in locations not easily accessible.

Retaining or snap-rings are either "internal" or "external". The internal type of snap-ring is used to retain elements such as bearings or shafts within a bore. A snap-ring extends circumferentially between a pair of free ends which have apertures to receive tips of the tool. The force applied by the tool either spreads the free ends to expand the ring or moves the free ends together to contract the ring. In order to install the ring in a bore it is contracted to allow it to pass into the bore, and then allowed to expand for engagement with an internal groove formed around the bore. The external type of retaining ring is used to retain elements such as bearings, gears or pulleys on shafts. An external ring normally engages an annular groove formed in the outer surface of a shaft to inhibit axial movement of an element mounted on the shaft. An external ring is installed by expanding the ring until its internal diameter is greater than the shaft. The tool is generally necessary for installing the snap-ring in and removing the snap-ring from either internal or external grooves. In addition, the expanding or contracting of the snap-ring must be maintained until the installation in the internal or external groove is complete. This may be difficult if access to the groove is restricted.

Snap-ring tools of the industry for installing and removing snap-rings are typically made as pliers comprising two jaws made integral with two handles pivoted together in the center. These single purpose pliers are each intended to remove of install one type of ring only. A mechanic is required to have snap-ring pliers for both internal and external snap-rings. A typical snap-ring tool is disclosed in U.S. Pat. No. 5,943,754. The tips of the jaws of '754 and the angle of the tips with respect to the jaws are unique to free ends of the snap-ring.

It is desirable to effect movement of the tips in the jaws outwardly to expand the snap-ring, and, at other times, it is desirable to effect the movement of the tips in the jaws inwardly to contract the snap-ring. A conventional snap-ring pincher tool in common use at the present for internal use comprises two jaws and two handles pivoted together at the center to operate as pliers. The jaws have tips at one end to engage free end apertures of the snap-ring. When not in use, the handles and the jaws with tips are pushed open by a spring. The jaws are closed by gripping the handles to install an internal snap-ring. A conventional snap-ring expander comprises two jaws and two handles pivoted together at the center to again operate as pliers. However, when the handles are pushed open by a spring, the jaws with tips are closed. Gripping the handles opens the jaws to install an external snap-ring. Conventional pliers, which can be converted from a pincher tool to an expander tool for either internal or external snap-rings, are disclosed in U.S. Pat. Nos.: 4,793,224 and 6,257,105. Both '224 and '105 include removable jaws with tips that can be alternately attached to the pivoting handles to provide either the pincher or the expander tool. The operation of these tools requires continuous gripping of the handles to maintain the snap-ring in a contracted or expanded configuration. In addition , as with any snap-ring pliers, the tips are not only displaced one from the other, but they are also rotated about a pivotal axis of the pliers. This rotation must be provided for by the tips themselves or the apertures and /or cutouts in the free ends of the snap-rings.

Manipulation between internal and external tool operating positions of a snap-ring tool has been disclosed in U.S. Pat. Nos.: 4,625,379; 5,065,650; 5,174,177; and 6,378,403. In the '177 and '650 patents a pair of levers includes a boss portion interconnecting the handles with the jaw portions for manipulation between internal and external tool operating positions. Movement between the internal and external positions is provided by a rotatable eccentric knob. The '379 patent includes latch members which are switched so that the handles are coupled to a different jaws depending on the location of the latch members. In the '403 patent the pliers convert from external to internal use by operating a pair of pins disposed in the jaws. All of the patents require an adjustment of the tool to change the movement of the tips from internal to external snap-rings. Once again, the operation of these tools requires continuous gripping of the handles to maintain the snap-ring in a contracted or expanded configuration, and the tips are not only displaced one from the other, but they are also rotated about a pivotal axis of the pliers.

The need remains to provide a single snap-ring tool that can be operated for internal and external applied rings without adjusting or modifying the tool. Another need is to have a snap-ring tool that can maintain the snap ring in a expanded or contracted configuration without continuously gripping the tool. Many applications of snap-rings involve difficult areas to access. The more freedom in the ability to manipulate the tool the easier the installation or removal of the snap-ring becomes. A further need is to have the tips move with respect to one another without a rotational displacement. That is, the jaws holding the tips must linearly translate from one another to eliminate any rotation.

Accordingly, an object of the present invention is to provide a single universal tool that can function equally well with externally or internally applied retainer or snap-rings without the need for any adjustment.

Another object of the present invention is to provide a jaw positioning assembly configured to move the jaws of the universal tool so they translate from one another without rotation. A further aspect of the translating jaws is to provide for symmetrical displacement of the jaws with respect to the handle centerline A further object of the present invention is to provide a universal snap-ring tool which can expand or contract a snap-ring and hold the expanded or contracted configuration without continuously gripping the handle of the tool to provide the best orientation of the tool to install or remove the snap-ring.

SUMMARY OF THE INVENTION

The above objectives are accomplished according to the present invention by providing a retaining or snap-ring tool that can be universally used with either internally or externally applied snap-rings. The universal tool has a pair of jaws that include a tip to interface with the free ends of the snap-ring to either expand or contract the ring. A jaw positioning device moves the jaws apart, unlike the snap-ring pliers known in the industry. A single handle is connected to a first jaw and the second jaw is supported from the first jaw by the positioning device. A positioning wheel of the positioning device is rotated to move the jaws carrying the tips to any desired position to operate the snap-ring. The handle can be released without changing the deformation of the snap-ring.

In one embodiment of the invention, a universal tool for fitting and removing snap-rings with both external and internal operating movement is provided. The universal tool comprises a jaw assembly connected to a handle assembly. First and second jaws of the jaw assembly each have upper and lower ends. The first and second jaws are disposed to be linearly separated a uniform distance one from the other. A pair of tips each disposed at a respective one of said lower ends of the first and second jaws to engage the snap-rings and alter their circumferential dimensions. A single handle of the handle assembly is connected to said upper end of the first jaw for holding the pair of jaws in one hand with the tips in a position to engage a respective snap-ring. A jaw positioning device of the jaw assembly is for supporting the second jaw from the first jaw the uniform distance. Operating the jaw positioning device linearly displaces the pair of jaws with tips one from the other. The jaw positioning device comprises a pair of guide pins attached to one of the jaws and extends through guide apertures of the other jaw for maintaining a uniform distance between the first and second jaws. At least one threaded shaft interconnects the first with the second jaw so that rotating the threaded shaft in one direction moves the jaws closer together and and rotating the threaded shaft in the other direction moves the jaws further apart.

In another embodiment of the present invention, first and second jaws of the jaw assembly each have, once again, an upper end and a lower end. However, the first and second jaws are disposed to be rotationally separated one from the other. A jaw pivot pin connects the upper end of the second jaw to the first jaw so that the second jaw is rotationally supported by the first jaw. The jaw positioning device comprises a pair of shaft pins to receive a pair of the threaded shafts so that rotating the threaded shafts in one direction decreases the angle between the first and second jaws and rotating the threaded shafts in the other direction increases the angle between the first and second jaws In one aspect of the invention the lower ends of the first and second jaws each have an aperture so that tips at the lower ends of the jaws are removable to be replaced by a alternate pair of tips. Additional pairs of tips are provided to replace the pair of tips for different snap-ring types.

In another aspect of the present invention, the handle is made with a cavity to accept the folding jaw assembly realized by providing a pivot pin connection between the handle assembly and the jaw assembly. In a further aspect the handle assembly can be made with a storage compartment for extra snap-rings, tips and the like.

In yet another embodiment of the invention, first and second jaws of the jaw assembly each have first and second ends with the jaws disposed to be linearly and symmetrically separated a uniform distance one from the other with respect to a central tool axis. A glide portion supports the first and second jaws in a position to be symmetrically displaced apart with respect to a central tool axis. A single handle of the handle assembly is affixed to a support arm of the glide portion for holding the guide portion in one hand to support said pair of jaws. The pair of tips are each inserted in and held by said first ends of said first and second jaws to engage said snap-rings and alter their circumferential dimensions. The pair of tips are removable so that an alternate pair of tips can replace the pair of tips. A glide portion supports the first and second jaws in a position to be symmetrically displaced apart with respect to a central tool axis. A single handle of the handle assembly is affixed to the glide portion for holding the glide portion to support the pair of jaws with the pair of tips in a position to engage the snap-ring. A jaw positioning device of the jaw assembly displaces said first jaw from said second jaw the uniform distance. Therefore, operating said jaw positioning device linearly displaces the pair of jaws with tips one from the other in a symmetrical offset arrangement with respect to the central tool axis. The glide portion includes a support arm affixed at one end to the single handle, a glide slot built integral with the other end of the support arm for supporting the first and second jaws, a jaw pin at the second end of each jaw for slidably connecting the first and second jaws to the glide portion and a wheel centering tab of the glide portion to maintain the first and second jaws in the symmetrical offset arrangement. A slotted positioning wheel is made integral with a pair of threaded shafts for the user to rotate the threaded shafts to change the distance between the first and second jaws. The wheel centering tab meshes with a slot in the slotted positioning wheel.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein different embodiments of the invention are shown and wherein.

DESCRIPTION OF A PREFERRED EMBODIMENT

The retainer or snap-ring tool of this invention includes a pair of jaws with only one of the jaws attached to a single handle. The jaws are disposed to be spread apart one from the other by a jaw positioning device. The lower end of each jaw has a tip to interface with the free ends of the various types of snap-rings, to extend or contract the snap-ring when placing the ring on a shaft or within a cylindrical bore of a body. The jaw positioning device comprises at least one threaded shaft having a positioning wheel formed integral with the shaft to rotate the shaft and move the pair of tips at the ends of the jaws with respect to one another. The tips remain a fixed distance from one another without gripping the handle. This is a unique feature of the present invention and provides added freedom for the user in locating or retrieving snap-rings. The tool of this invention works equally well for internally and externally applied snap-rings without any changing or modification of the tool, referred to herein as a "universal snap-ring tool".

Figure 1:
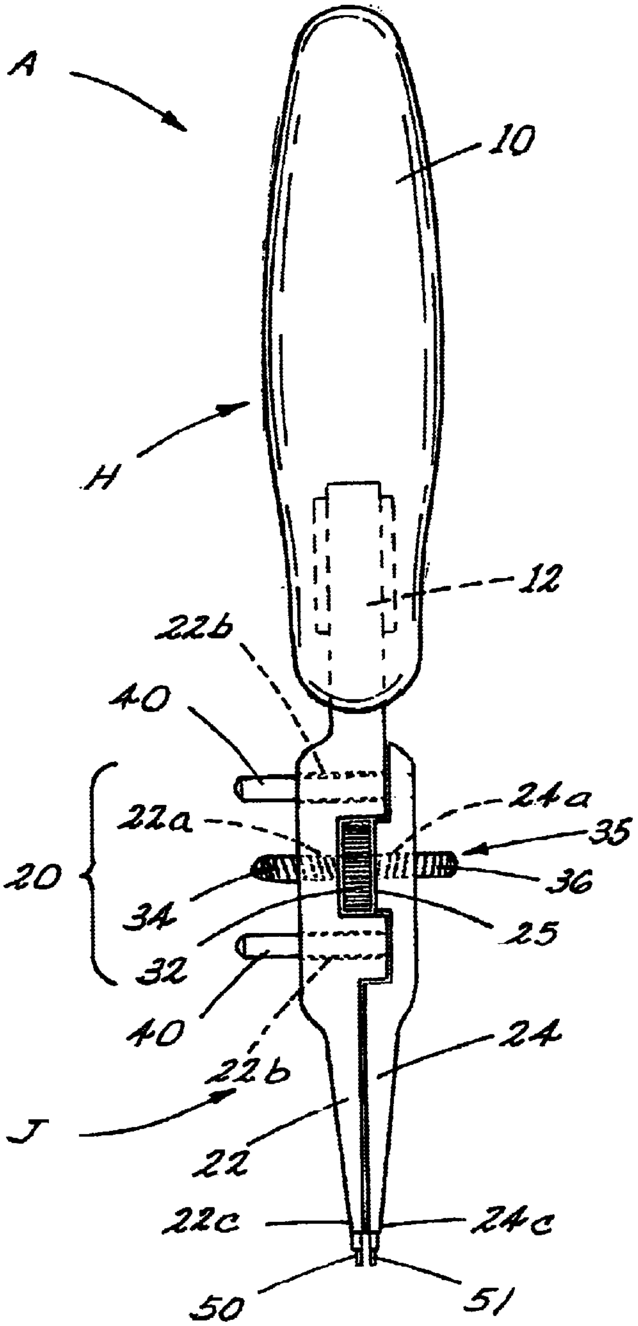
FIGS. 1 and 1A are elevation views of the preferred embodiment of a universal snap-ring tool of the present invention having first and second jaws, each with a tip to operate a snap-ring, and a jaw positioning assembly, whereby a single handle is attached to the first jaw and the second jaw is linearly disposed from the first jaw by the jaw positioning assembly for operating both internal and external rings.
Figure 1A:
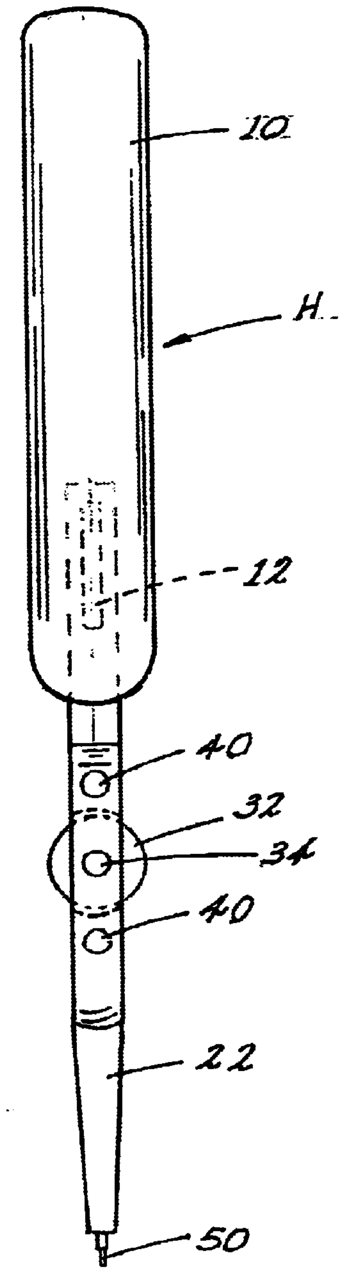

Referring now in more detail to the drawings, the invention will now be described in more detail. The preferred embodiment of the invention is illustrated in FIGS. 1 and 1*a*. A handle assembly "H" is connected with a jaw assembly "J" to form a retainer or snap-ring tool of this invention. The tool is universally used for externally and internally applied snap rings. Therefore, the tool is referred to in this description as a "universal" tool. The jaw assembly includes a first jaw 22 connected to a handle 10 by a handle attachment 12. The first jaw supports a second jaw 24 by means of a jaw positioning device 20. The first and second jaws have lower ends 22*c* and 24*c* for supporting different pairs of tips 50 and 51 (see FIGS. 8*a*–8*g*) at the lower ends of the first and second jaws respectfully. A tip is preferably formed as an integral part of a respective jaw. Alternately, the tips may be placed in apertures at the lower ends of the jaws to be removed and replaced. The tips interface free ends of a snap-ring (not shown) for installing and/or removing the snap-ring, as discussed in the background of the invention.

Jaw positioning device 20 includes a pair of guide pins 40 connected to and extending from second jaw 24. The guide pins each pass through apertures 22*b* in the first jaw to restrict the relative displacement of the second jaw with respect to the first to be a linear translation. A first threaded shaft 34 extends through a threaded aperture 22*a* in the first jaw and a second threaded shaft 36 extends through a threaded aperture 24*a* in the second jaw. The two threaded shafts 34 and 36 are co-linear forming a single shaft 35, with threads of shaft 34 having an opposite direction to that of shaft 36. A rotation of shaft 35 linearly translates one jaw with respect to the other jaw, either moving them apart or moving them together. A positioning wheel 32 is provided to make it easier to rotate the shaft in either rotational direction. A wheel recess 23 is provided in first jaw 22 and a wheel extension 25 is provided on second jaw 24 so that the positioning wheel has a symmetrical position with respect to the pair of jaws and the handle.

Figure 2:
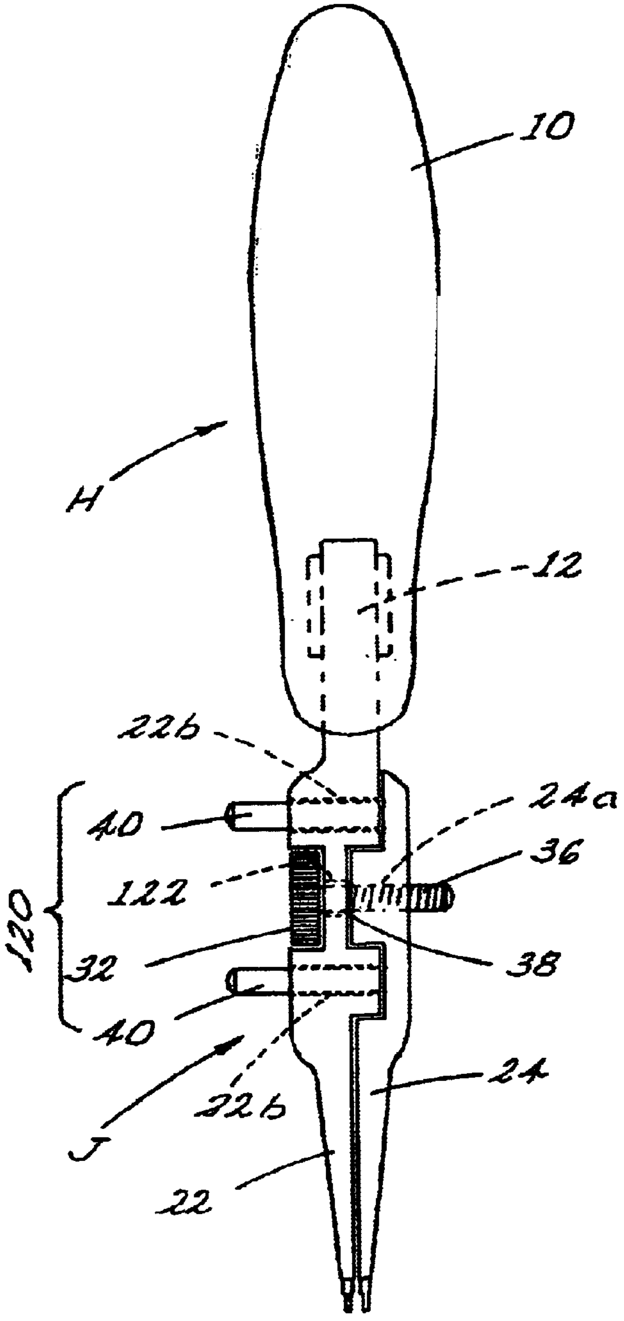
FIGS. 2 and 2A are elevation views of the snap-ring tool of FIGS. 1 and 1A showing a second embodiment of the jaw positioning assembly.
Figure 2A:
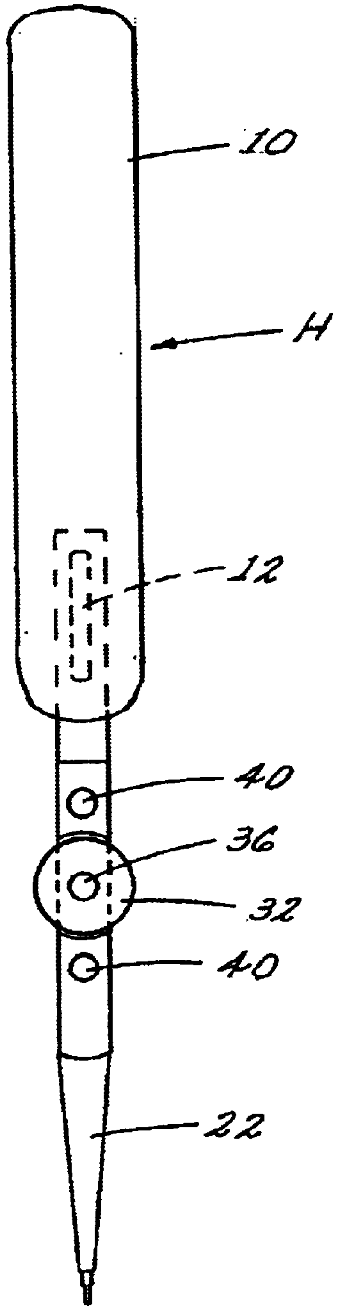

A second embodiment of the invention is illustrated in FIGS. 2 and 2*a*; having first and second jaws 22 and 24 positioned from one another by a jaw positioning device 120. Once again, the first jaw is supported by handle assembly H having a handle attachment 12 wherein the first jaw is supported by handle 10. In this embodiment, positioning wheel 32 has been moved to be accessed from the exterior of the first jaw and threaded shaft 36 remains. The threaded shaft is affixed to the positioning wheel, passes through a shaft aperture 122 in the first jaw and meshes with threaded aperture 24*a* of the second jaw. The threaded shaft is held in the shaft aperture of the first jaw by a shaft retainer ring 38, but is free to rotate so that rotation of the threaded shaft positions second jaw 24 any desired distance with respect to first jaw 22. Guide pins 40 insure that the second jaw is offset parallel to the first jaw and jaw protrusion 38 of the second jaw has been increased over the previous embodiment.

Figure 3:
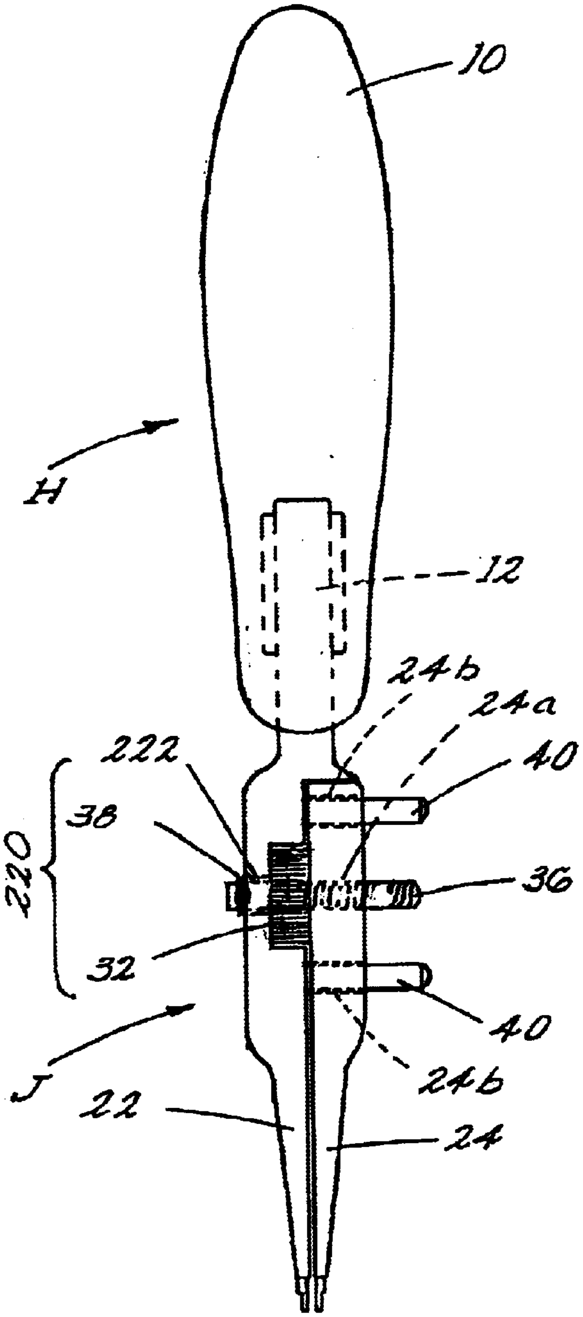
FIGS. 3 and 3A are elevation views of the snap-ring tool of FIGS. 1 and 1A showing a third embodiment of the jaw positioning assembly.
Figure 3A:
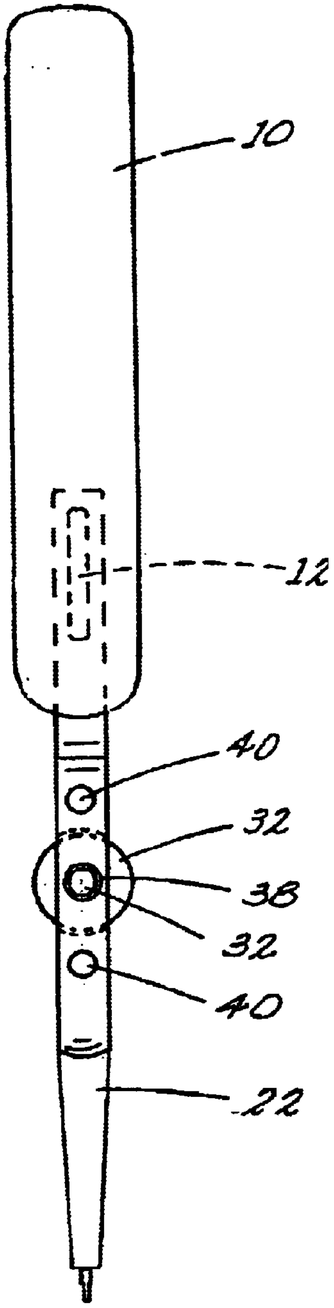

A third embodiment of the invention, illustrated in FIGS. 3 and 3*a*, has first and second jaws 22 and 24 positioned from one another by a jaw positioning device 220. Again, the first jaw is supported by handle assembly H having a handle attachment 12 connecting a handle 10 to first jaw 22. The jaw positioning device of this embodiment includes guide pins 40 affixed to the first jaw and extending through apertures 24*b* in the second jaw. The jaw protrusion of the second jaw has been eliminated in this embodiment such that positioning wheel 32 is adjacent the second jaw. Threaded shaft 36 is affixed to the positioning wheel and meshes with threaded aperture 24*a* in the second jaw. Rotation of the positioning wheel positions the second jaw away from the first jaw a uniform distance. An extension shaft 234 affixed to positioning wheel 32 extends through a shaft aperture 222 in the first jaw. A shaft retainer ring 38 on the extension shaft holds the positioning wheel and extension shaft attached to the first jaw to allow rotation without laterally displacing the positioning wheel with respect to the first jaw.

Figure 4:
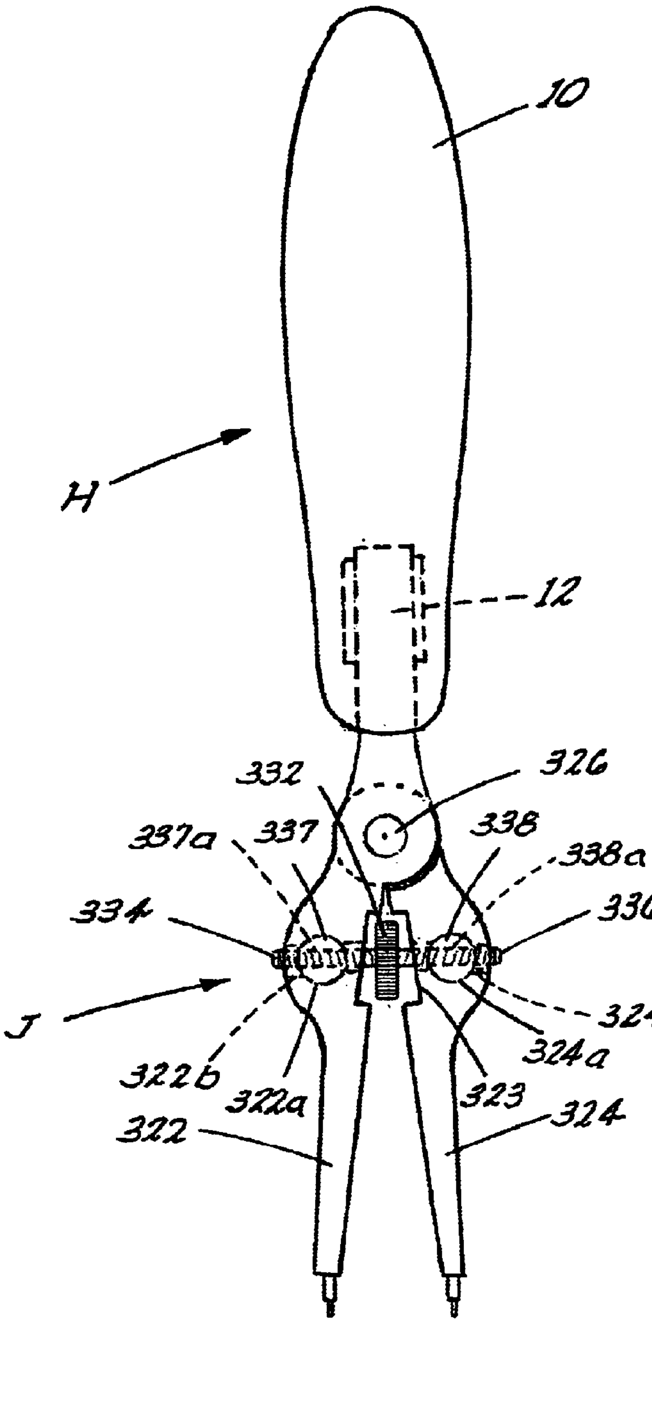
FIGS. 4 and 4A are elevation views of a fourth embodiment of the universal snap-ring tool of the present invention having first and second jaws, each with a tip to operate a snap-ring, and a jaw positioning assembly, whereby a single handle is attached to the first jaw and the second jaw is rotationally disposed from the first jaw by the jaw positioning assembly for operating both internal and external rings.
Figure 4A:
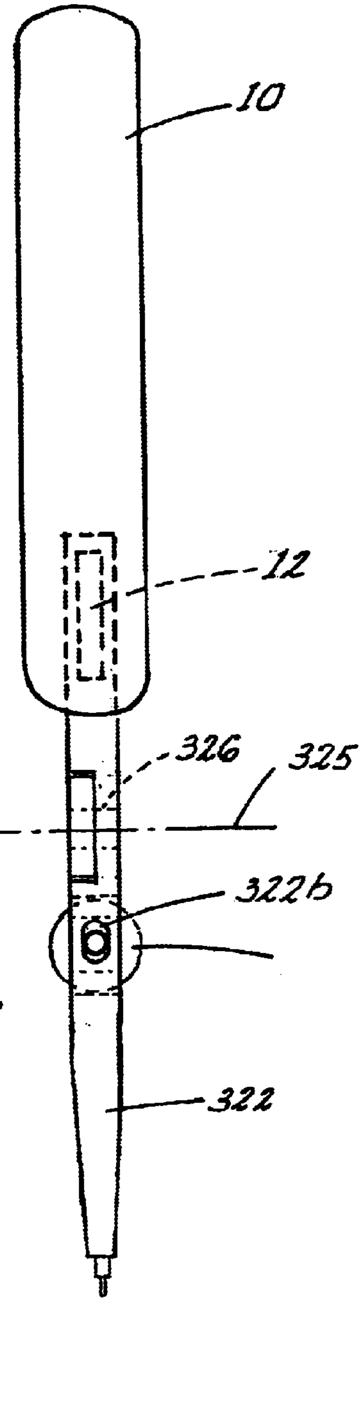

The fourth embodiment of the invention, illustrated in FIGS. 4 and 4*a*, has first and second jaws 322 and 324 which are connected by a jaw pivot pin 326 so that the second jaw are rotationally supported from the first jaw about a jaw pivot axis 325. The first jaw is again supported by handle assembly H having a handle attachment 12 connecting a handle 10 to first jaw 322. A jaw positioning device 320 of this embodiment includes a shaft pins 337 of the first jaw and a shaft pin 338 of the second jaw. Shaft pin 337 is supported in a first aperture 322*a* of the first jaw and shaft pin 338 is supported in a second aperture 324*a* of the second jaw so that the shaft pins are free to rotate with respect to the jaws. The shaft pins have threaded apertures 337*a* and 338*a* to receive a threaded shafts 336 and 334 respectively. The threaded shafts are affixed on opposite sides of a positioning wheel 330 so that rotation of the position wheel rotates the second jaw with respect to the first jaw about jaw pivot axis 325. Cutout 322*b* of the first jaw and cutout 324*b* of the second jaw provide space in each jaw for the threaded shafts to extend through the jaws without interference. The tips are positioned apart by relative rotations about the jaw pivot axis as the positioning wheel is rotated. A wheel recess 323 is provided in each jaw to accommodate the positioning wheel when the tips are positioned near to one another. This fourth embodiment is designed to work like a compass tool used by a draftsman.

Figure 5:
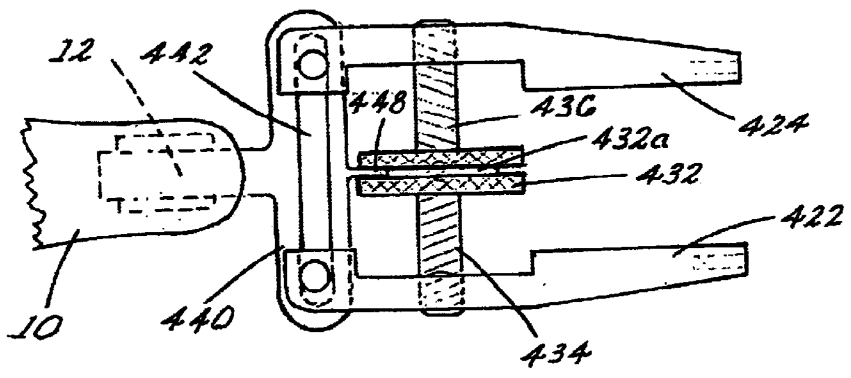
FIGS. 5, 5A and 5B are front and side elevation views of a fifth embodiment of the universal snap-ring tool of the present invention having first and second jaws, each with a tip to operate a snap-ring, and a jaw positioning assembly, whereby a single handle supports a glide portion so that the positioning assembly moves the first and second jaws in equal but opposite directions with respect to the centerline of the glide portion and handle.
Figure 5A:
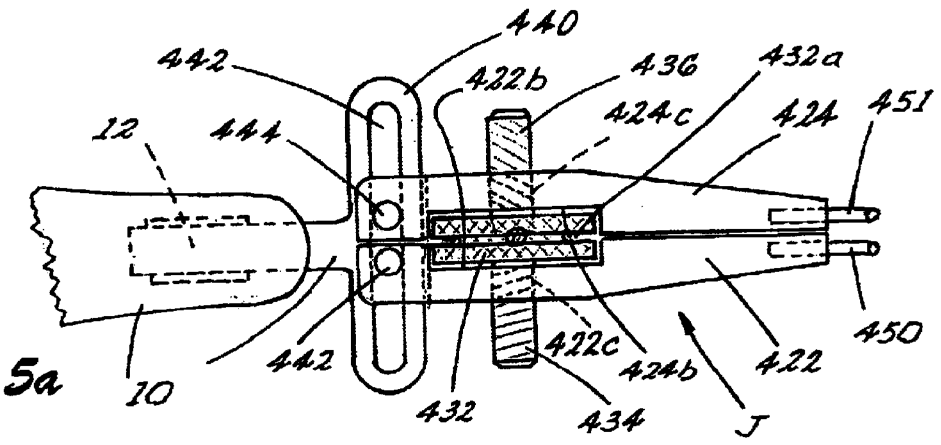
Figure 5B:
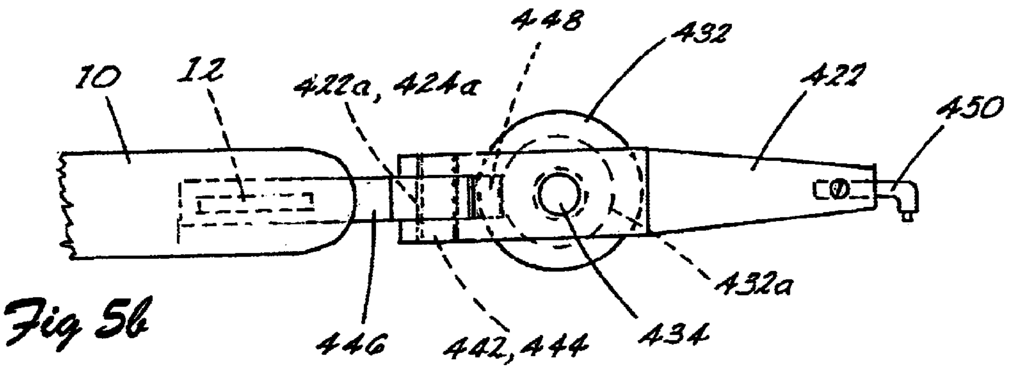

In a fifth embodiment of the invention, first and second jaws 422 and 424 respectively are made to move parallel with one another and symmetrical with respect to a longitudinal axis of the universal snap-ring tool, as illustrated in FIGS. 5, 5*a* and 5*b*. A glide portion 440 having a glide slot 442 and a support arm 446 supports the first and second jaws. Handle attachment 12 connects handle 10 with the support arm of the glide portion. End cutouts 422*a* and 424*a* in jaws 422 and 424 respectively receive the glide portion. Jaw pin 442 affixed to the first jaw extends through the glide slot to slidably connect the first jaw with the glide portion. Jaw pin 444 affixed to the second jaw extends through the glide slot to slidably connect the second jaw with the glide portion. A first threaded shaft 434 and a second thread shaft 436 affixed to a positioning wheel 432 provide the means to position the first and second jaws, along with their respective tips 450 and 451, apart. The first and second jaws have wheel cutouts 422*b* and 424*b* respectively to provide space for the positioning wheel 432 to be located at a central location along the tool axis A. The first threaded shaft engages a threaded aperture 422*c* of the first jaw and the second threaded shaft engages a threaded aperture 424*c* of the second jaw. Rotating the positioning wheel positions the jaws with their respective tips apart on from the other. A centering tab 448 affixed to glide portion 440 engages a slot 432*a* in the slotted positioning wheel to keep the jaws symmetrically positioned with respect to central tool axis A. In one aspect of this embodiment, tips 450 and 451 are replaceable.

Figure 6:
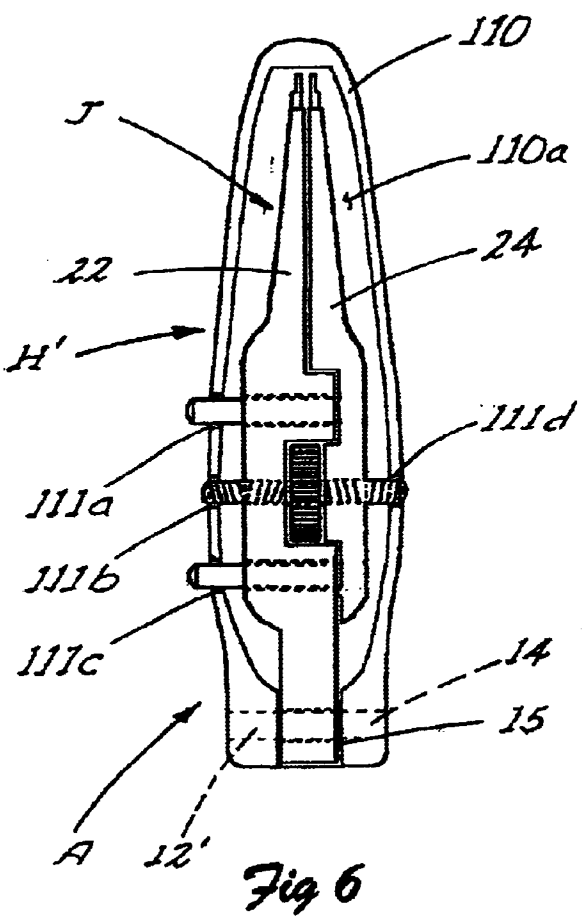
FIGS. 6 and 6A are elevation views of another aspect of the present invention of FIGS. 1 and 1A wherein the handle comprises a cutout and a handle pivot pin so that the operation portion of the tool folds into the handle portion for compact storage when the tool is not being used.
Figure 6A:
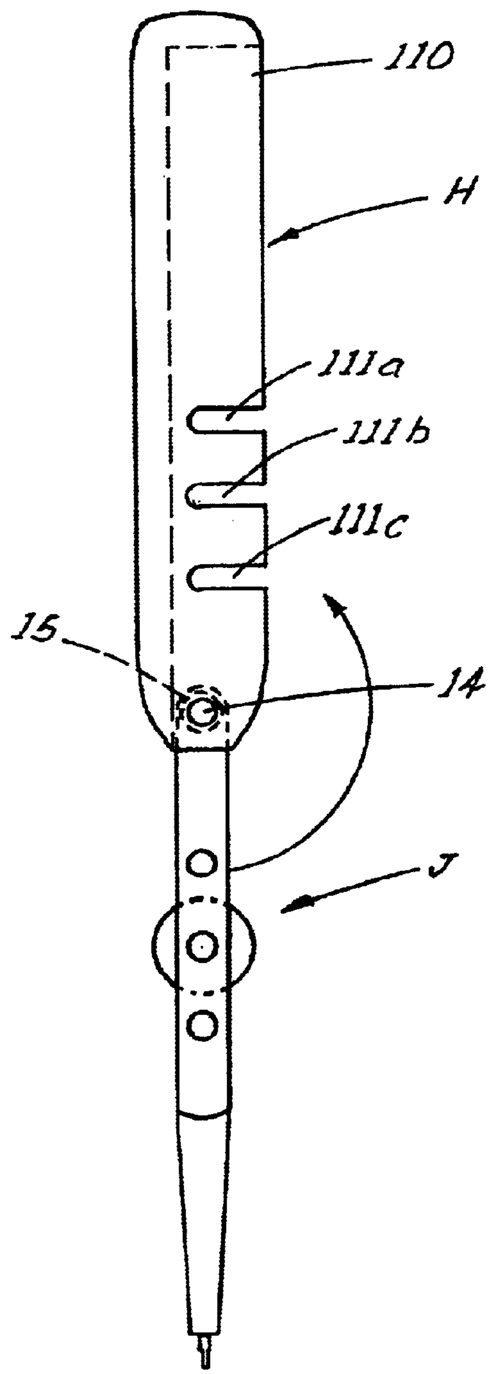

In one aspect of the present invention a handle assembly H' includes a handle 110 with a handle cavity portion 110*a*, as illustrated in FIGS. 6 and 6*a*. Handle attachment device 12' includes a handle pivot pin 14 extending through handle 110 and the first jaw 22 of jaw assembly J. A compression spring 15 placed around the handle pivot pin and placed between the handle and the first jaw allows the jaw assembly to remain extended or stored in the handle cavity portion. The second jaw 24 is positioned adjacent first jaw 22 so that the jaw assembly can be rotated about handle pivot pin 14 to be stored in the handle cavity portion. Slots 111*a* and 111*c* of the handle provide cutouts to receive the guide pins 40 of the jaw assembly and slots 111*c* and 111*d* of the handle provide cutouts for the threaded shafts 34 and 36 of the jaw assembly. A different arrangement of slots can be provided for the different embodiments of the invention; depending on the location of the guide pins and the threaded shafts.

Figure 6B:
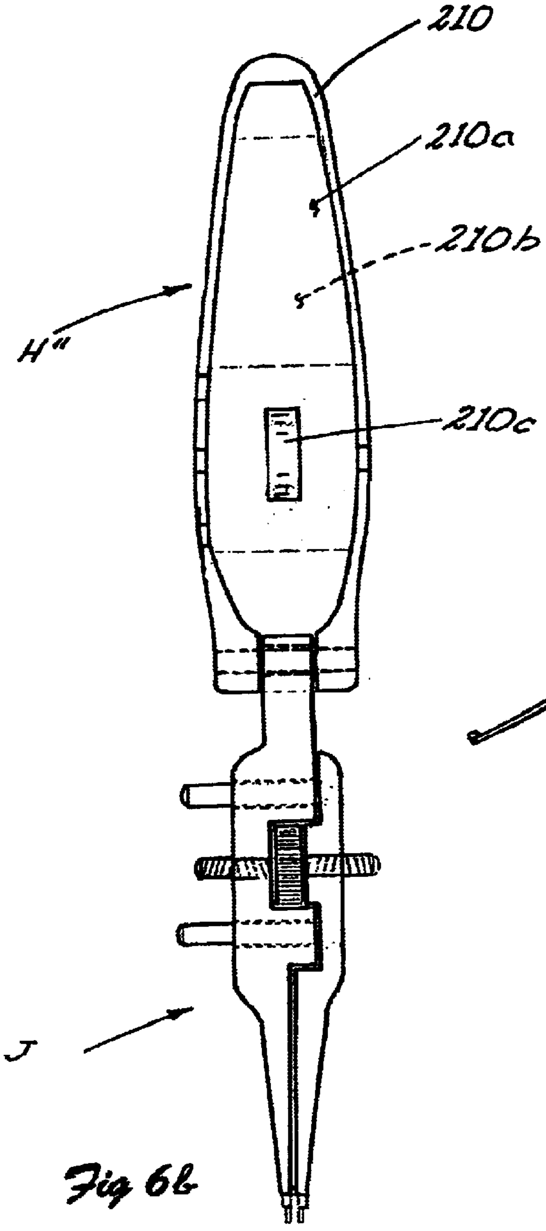
FIGS. 6B and 6C are elevation views of yet another aspect of the present invention of FIGS. 6 and 6A wherein the handle provides a storage compartment in addition to the cutout for spare snap-rings as well as alternate tips for use at the lower ends of the jaws.
Figure 6C:
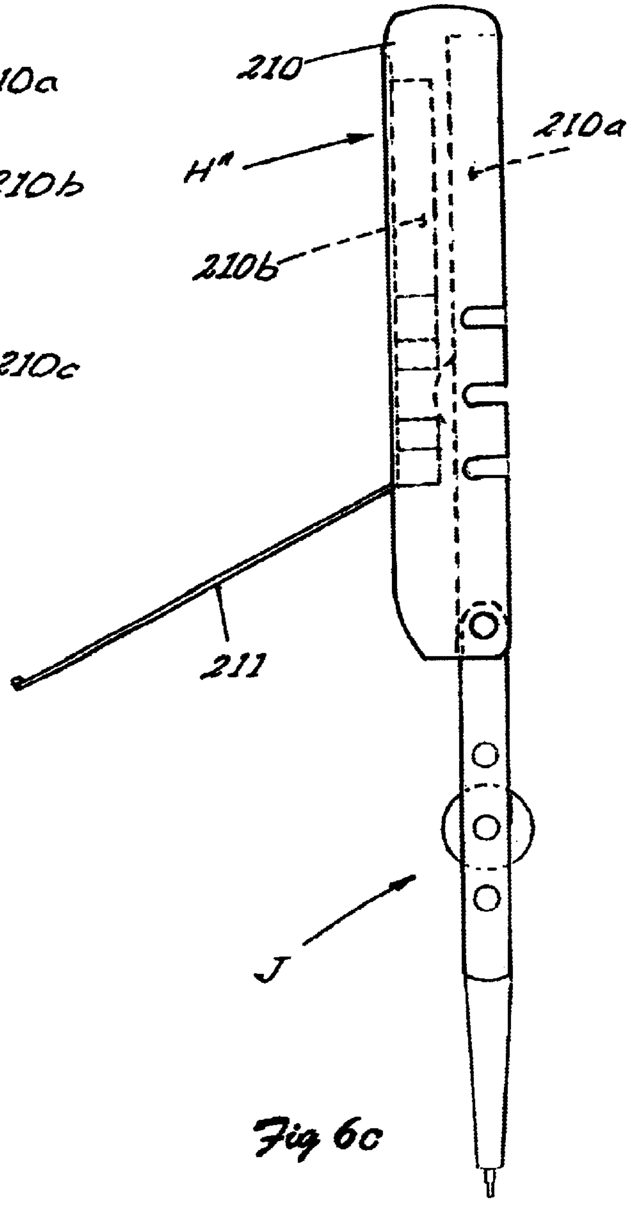

In a further aspect of the invention a handle assembly H" includes a handle 210 having a handle cavity portion 210*a* and a handle storage compartment 210*b*, as illustrated in FIGS. 6*b* and 6*c*. The storage compartment is used for various components, such as spare tips and other tools. A hinged door is provided to secure the components within the storage compartment when closed.

Figure 7:
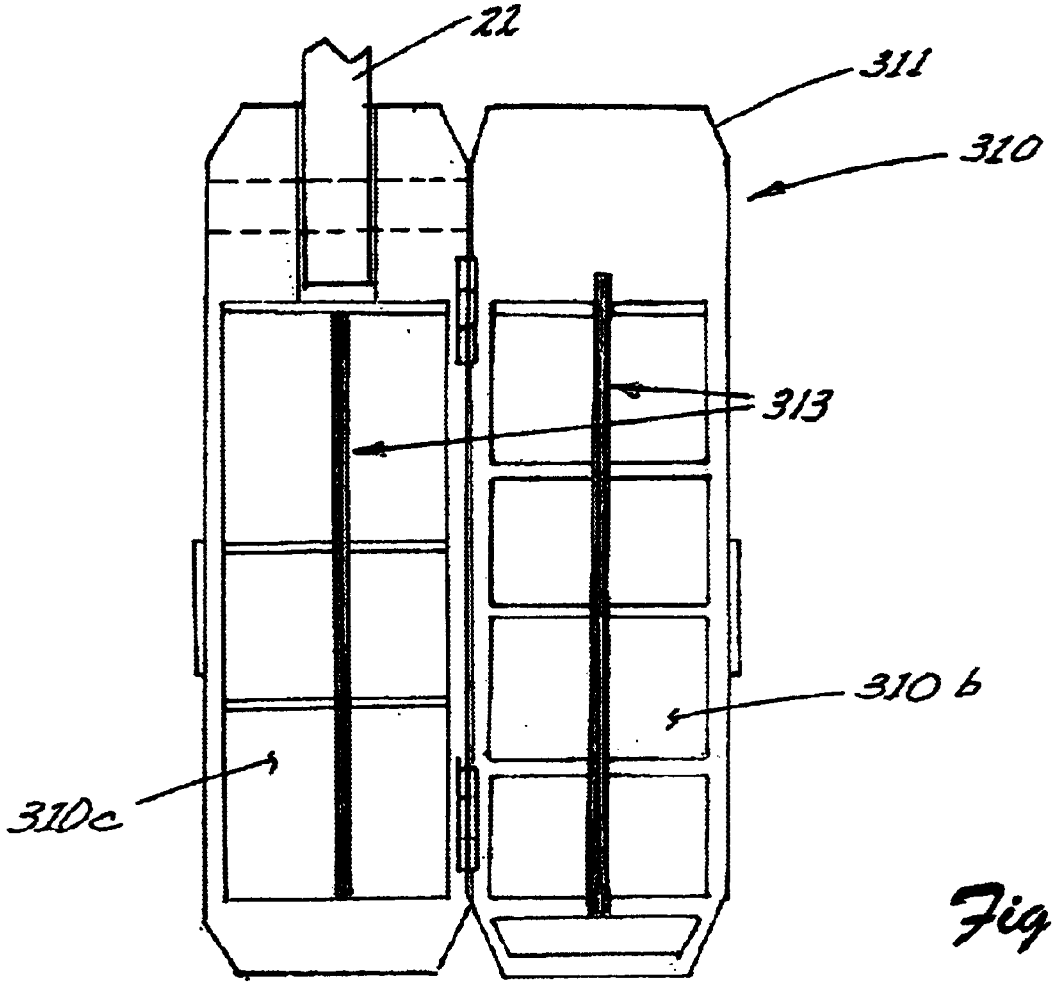
FIG. 7 is an internal elevation view of storage compartment of FIGS. 6B and 6C showing a magnetic strip for holding parts in the storage compartment.

In yet another aspect of the invention, a handle 310 having handle storage compartments 310*a* and 310*b* includes a pair of magnetic strips 313, as illustrated in FIG. 7. The magnetic strips keep the stored components from moving in the handle storage compartments. Movement may produce wear of the components making contact with one another before they are used.

Figure 8A:
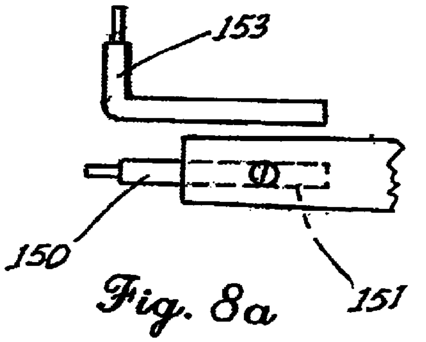
FIGS. 8A–8G are perspective views of typical conventional tips that can alternately be provided at the lower ends of the jaws to operate different type snap-rings.
Figure 8B:
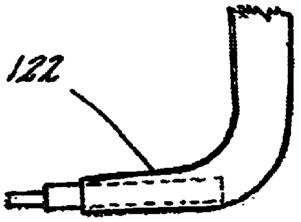
Figure 8C:
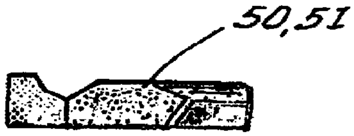
Figure 8D:
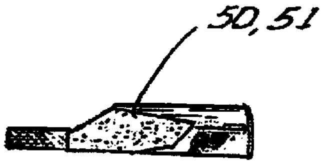
Figure 8E:
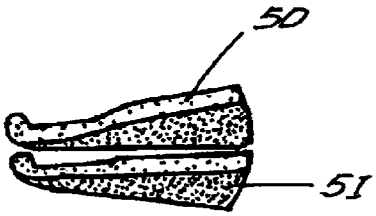
Figure 8F:
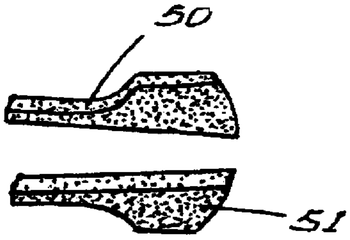
Figure 8G:
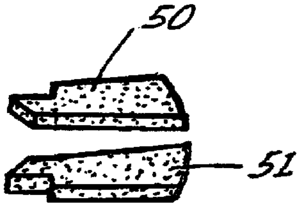

Tips of various kinds and types can be formed in the lower ends of the jaws. FIGS. 8*a*–8*g* illustrate typical tips used in the industry. The tips may be integrally formed at the end of each jaw for a single snap-ring type, as illustrated in FIGS. 8*c*–8*g*. Tips 150 and 153 may also be formed as a separate component to be placed in an aperture 152 at the end of each jaw, as illustrated in FIGS. 8*a* and 8*b*. Angled tips 153 or angled lower ends 122*c* of the jaws also provide for special needs of the user with different snap-rings. All of these tips and others of the industry are included in the scope of the present invention.

A combination of structural features from different embodiments can be used together to form a single universal snap-ring tool consistent with the claimed invention. While a preferred embodiment as well as other embodiments of of the invention has been described using specific terms, such description is for illustrative purposes only, and it is to be understood that changes and variations may be made without departing from the spirit or scope of the following claims.

What is claimed is:

1. A universal tool for fitting and removing snap-rings with both external and internal operating movement comprising:

a jaw assembly connected to a handle assembly;

first and second jaws of said jaw assembly each having upper and lower ends, wherein said first and second jaws are disposed to be linearly separated a uniform distance one from the other;

a pair of tips each disposed at a respective one of said lower ends of said first and second jaws to engage said snap-rings and alter their circumferential dimensions;

a single handle of said handle assembly connected to said upper end of said first jaw for holding said pair of jaws in one hand with tips in a position to engage a respective snap-ring; and a jaw positioning device of said jaw assembly for supporting said second jaw from said first jaw the uniform distance, wherein operating said jaw positioning device linearly displaces said pair of jaws with tips one from the other.

2. The tool of claim 1 wherein the jaw positioning device comprises;

a pair of guide pins attached to a one of said first jaw and said second jaw and extending through guide apertures of the other jaw for maintaining the uniform distance between said first and second jaws; and at least one threaded shaft interconnecting said first jaw with said second jaw so that rotating said threaded shaft in one direction moves the first and second jaws closer together and rotating said threaded shaft in the other direction moves said first and second jaws further apart.

3. The tool of claim 2 wherein said at least one threaded shaft includes a positioning wheel made integral with said threaded shaft for the user to rotate said threaded shaft to change the distance between the first and second jaws.

4. The tool of claim 1 wherein said handle assembly includes a cavity portion on one lateral side of said single handle for reducing the handle mass and providing a storage area for said jaw assembly within said handle assembly.

5. The tool of claim 4 wherein said first jaw is connected to said single handle by a pivot pin having a compression spring so that said jaw assembly can be rotated to fit within said cutout portion of said single handle.

6. The tool of claim 4 wherein said handle assembly includes a storage compartment with a hinged door on the other side of said single handle from said cutout to provide for additional pair of tips, snap-rings and the like.

7. The tool of claim 6 wherein said storage compartment includes a magnetic strip for holding said additional pair of tips, snap rings and the like within said compartment to avoid loose storage.

8. The tool of claim 1 wherein said lower ends of said first and second jaws include an aperture so that said pair of tips are removable from said apertures and replaced by an alternate pair of tips, wherein said pair of tips includes straight tips and angled tips to use on different snap-rings and wherein said tips are easily removed and replaced with said alternate pair of tips for use with different snap-ring types.

9. The tool of claim 8 wherein the lower ends of said first and second jaws are angled so that said pair of tips are positioned to provide access to the snap-rings which are difficult to access with straight lower ends of said first and second jaws.

10. A universal tool for fitting and removing snap-rings with both external and internal operating movement comprising:

a jaw assembly connected to a handle assembly;

first and second jaws of said jaw assembly each having upper and lower ends, wherein said first and second jaws are disposed to be rotationally separated one from the other;

a pair of tips each disposed at a respective one of said lower ends of said first and second jaws to engage said snap-rings and alter their circumferential dimensions;

a single handle of said handle assembly connected to said upper end of said first jaw for holding said pair of jaws in one hand with tips in a position to engage a respective snap-ring;

a jaw positioning device of said jaw assembly for supporting said second law from said first jaw, wherein operating said jaw positioning device displaces said pair of jaws with tips one from the other;

a jaw pivot pin for connecting the upper end of said second jaw to said first jaw so that said second jaw is rotationally supported by said first jaw; and said jaw positioning device comprises a pair of shaft pins each rotationally supported in a respective one of said first jaw and said second jaw and a pair of threaded shafts interconnecting said pair of shaft pins; wherein rotating said threaded shafts in one direction decreases the angle between the first and second jaws and rotating said threaded shafts in the other direction increases the angle between said first and second jaws.

11. The tool of claim 10 wherein said pair of threaded shafts includes a positioning wheel made integral with said threaded shafts for the user to rotate said threaded shafts to change the angle between the first and second jaws.

12. A universal tool for fitting and removing snap-rings with both external and internal operating movement comprising:

a jaw assembly connected to a handle assembly;

first and second jaws of said jaw assembly each having upper and lower ends, wherein said first and second jaws are disposed to be rotationally separated one from the other;

a pair of tips each disposed at a respective one of said lower ends of said first and second jaws to engage said snap-rings and alter their circumferential dimensions;

a single handle of said handle assembly connected to said upper end of said first jaw for holding said pair of jaws in one hand with tips in a position to engage a respective snap-ring;

a jaw positioning device of said jaw assembly for supporting said second jaw from said first jaw, wherein operating said jaw positioning device displaces said pair of jaws with tips one from the other;

a jaw pivot pin for connecting the upper end of said second jaw to said first jaw so that said second jaw is rotationally supported by said first jaw; and said handle assembly includes a cavity portion for storage of said jaw assembly in said handle assembly and a storage compartment with a hinged door on one side of said handle to provide for storage of additional pair of tips, snap-rings and the like.

13. A snap-ring tool for fitting and removing snap-rings with both external and internal operating movement comprising:

a jaw assembly connected to a handle assembly;

first and second jaws of said jaw assembly each having first and second ends, said jaws disposed to be linearly and symmetrically separated a uniform distance one from the other;

a pair of tips each inserted in and held by said first ends of said first and second jaws to engage said snap-rings and alter their circumferential dimensions, wherein said pair of tips are removable so that an alternate pair of tips can replace said pair of tips;

a glide portion for supporting said first and second jaws in a position to be symmetrically displaced apart with respect to a central tool axis;

a single handle of said handle assembly affixed to said glide portion for holding said glide portion to support said pair of jaws with said pair of tips in a position to engage the snap-ring; and a jaw positioning device of said jaw assembly for displacing said first jaw from said second jaw the uniform distance, wherein operating said jaw positioning device linearly displaces said pair of jaws with tips one from the other in a symmetrical offset arrangement with respect to said central tool axis.

14. The tool of claim 13 wherein said glide portion comprises:

a support arm affixed at one end to said single handle;

a glide slot built integral with the other end of said support arm for supporting said first and second jaws;

a jaw pin at said second end of each jaw for slidably connecting said first and second jaws to said glide portion; and a wheel centering tab of said glide portion to maintain the first and second jaws in said symmetrical offset arrangement.

15. The tool of claim 14 wherein said jaw positioning device includes:

a pair of threaded shafts to interconnect said first jaw with said second jaw so that rotating said threaded shaft in one direction moves the first and second jaws closer together and rotating said threaded shaft in the other direction moves said first and second jaws further apart; and a slotted positioning wheel made integral with said pair of threaded shafts for the user to rotate said threaded shafts to change the distance between the first and second jaws, wherein said wheel centering tab meshes with a slot in said slotted positioning wheel.

* * * * *